US007010609B1

(12) United States Patent
Black et al.

(10) Patent No.: US 7,010,609 B1
(45) Date of Patent: Mar. 7, 2006

(54) SYSTEM AND METHOD FOR ADDING TRANSPORT PROTOCOLS IN DISTRIBUTED MIDDLEWARE APPLICATIONS

(75) Inventors: Kenneth R. Black, Lakeland, FL (US); Robert M. Jensen, Lakeland, FL (US); Jorge E. Rodriguez, Apollo Beach, FL (US); Jonathan J. Currey, Lakeland, FL (US)

(73) Assignee: Borland Software Corporation, Scotts Valley, CA (US)

( * ) Notice: Subject to any disclaimer, the term of this patent is extended or adjusted under 35 U.S.C. 154(b) by 643 days.

(21) Appl. No.: 09/747,353

(22) Filed: Dec. 21, 2000

(51) Int. Cl.
*G06F 15/16* (2006.01)
*G06F 9/44* (2006.01)
*G06F 9/445* (2006.01)

(52) U.S. Cl. ............ 709/230; 709/230; 709/201; 719/311; 717/176

(58) Field of Classification Search ........ 719/311–332, 719/310; 709/220–223, 227, 229–230, 238, 709/250, 201–203; 717/136–137, 17
See application file for complete search history.

(56) References Cited

U.S. PATENT DOCUMENTS

| | | | | |
|---|---|---|---|---|
| 5,903,728 A | * | 5/1999 | Semenzato | 709/217 |
| 5,960,204 A | * | 9/1999 | Yinger et al. | 717/176 |
| 5,974,566 A | * | 10/1999 | Ault et al. | 714/15 |
| 6,026,404 A | * | 2/2000 | Adunuthula et al. | 707/10 |
| 6,125,388 A | * | 9/2000 | Reisman | 709/218 |
| 6,209,018 B1 | * | 3/2001 | Ben-Shachar et al. | 718/105 |
| 6,412,073 B1 | * | 6/2002 | Rangan | 713/202 |
| 6,611,862 B1 | * | 8/2003 | Reisman | 709/217 |
| 6,622,017 B1 | * | 9/2003 | Hoffman | 455/419 |
| 6,721,799 B1 | * | 4/2004 | Slivkoff | 709/236 |
| 2002/0107977 A1 | * | 8/2002 | Dunshea et al. | 709/238 |

OTHER PUBLICATIONS

Andrew T. Campbell, Geoff Coulson, Michael E. Kounavis: "Managing Complexity: Middleware Explained"; IT PRO, Sep. 30, 1999, pp. 22-28, XP002192898.*

* cited by examiner

*Primary Examiner*—Glenton B. Burgess
*Assistant Examiner*—Yasin Barqadle
(74) *Attorney, Agent, or Firm*—Darby & Darby

(57) ABSTRACT

A connection bridge mechanism for adding arbitrary protocols into a middleware-based application without accessing the source code for the middleware or producing a new version of the middleware source code. Using a connection bridge allows the plugged in protocol to be utilized by the middleware without requiring that the same O/S primitives which are utilized internally by the middleware be supported by the plugged in protocol. The plugged in protocol can be utilized in addition to the internally supported middleware protocols or it can replace the existing middleware protocols. The connection bridge provides the communication between the protocols and the middleware package. The connection bridge queues the requests from the protocols and notifies the middleware when there are requests pending for action by the middleware.

10 Claims, 18 Drawing Sheets

Fig. 2 A
Fig. 2 B
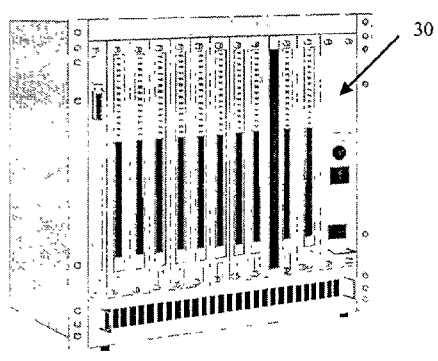
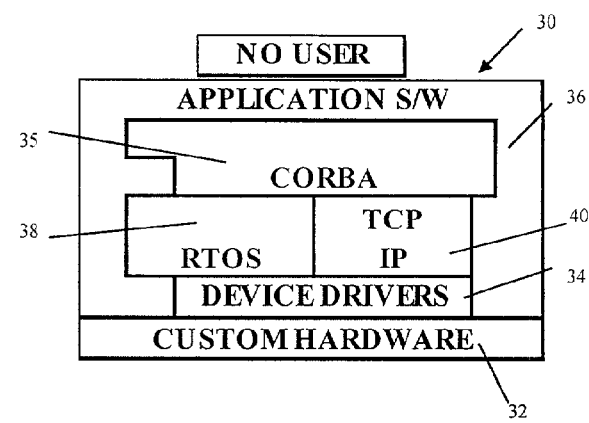

SYSTEM AND METHOD FOR ADDING TRANSPORT PROTOCOLS IN DISTRIBUTED MIDDLEWARE APPLICATIONS

TECHNICAL FIELD

The present invention relates generally to the utilization of distributed middleware applications and more particularly, relates to systems and methods for adding transport protocols to distributed middleware applications.

BACKGROUND OF THE INVENTION

Computers have evolved from the traditional stand-alone type of computer to computer systems utilizing computers distributed through a network. Some of these distributed computers remain traditional computer systems, while another type of computer has evolved, called an "embedded" computer. The distributed computers communicate with one another by utilizing defined transport protocols. For any two computers in a distributed system to communicate directly, they must both have installed and utilize the same transport protocol, and be capable of using that protocol on the type of network that connects them.

The network and the computers connected to it can be utilized to create distributed applications, which run simultaneously on more than one computer in the system. Many such distributed applications utilize object-oriented programming, wherein the programmers define not only the data type of a data structure, but also the types of operations that can be applied to that data structure. In this manner, the data structure becomes an object that includes both data and functions. A principal advantage of object-oriented programming techniques is that they enable programmers to create modules that do not need to be changed when a new type of object is added to the software. The programmer can simply create a new object that inherits many of the features from the objects already existing in the system. This facilitates the modification of object-oriented programs since the underlying objects do not need to be changed. Object orientation suits distributed programming well, as modularizing the application in terms of objects makes it easier to reason about the different parts of the application, that are running on different computers in the network. In an object-oriented distributed system, one or more objects that constitute part of the distributed application will be located on each of the computers that the application is running on. The foregoing notwithstanding, distributed applications still can be and sometimes are built using non object-oriented methods.

Distributed systems are very often implemented with the help of a supporting sub-system called "middleware." Middleware is commonly utilized to hide the operating system (O/S) calls and the network transport protocol programming required to build the distributed computer system. Non-object oriented middleware systems such as Message Oriented Middleware (MOM), or queue based middleware fulfill this task of isolating the application from the O/S and the transport particulars without necessarily imposing an object orientation upon the application builder. One example of object oriented middleware is the Common Object Request Broker Architecture (CORBA), which is an architecture that enables the pieces of distributed programs in the forms of objects to communicate with one another regardless of what programming language they are written in or what operating system they are running on. There are a number of implementations of CORBA and several competing architecture models, such as Microsoft's Distributed Component Object Model (DCOM).

When using middleware, such as CORBA, the transport protocols that are used are by default fixed to one or more of the most common transport protocols, such as Transmission Control Protocol (TCP), which is one of the main protocols in the familiar TCP/IP protocol suite (the Internet protocol (IP) deals only with packets, whereas TCP enables two hosts to establish a connection and exchange streams of data). In the simplest implementation of middleware, the support for the selected protocol or protocols is written as part of the implementation of the middleware package. If the middleware package supports multiple protocols, the distributed applications developed using the middleware may or may not be offered a way to select which of the protocols is used. The choice of protocol will be something that can be specified via a call in the middleware's Application Program Interface (API), which is the set of functions or method calls that is used to build the distributed software application. However in this simplest implementation, the middleware package is fixed with respect to the communication protocols that it will accept, and the applications can only choose from those protocols that the middleware was made aware of when it was implemented.

Support can be added for another desired protocol, but it requires adding code to the source code for the middleware package. The source code for the middleware package then must be recompiled, which results in a new version of the middleware package. This recoding and recompiling process typically is performed by a middleware vendor or by a very experienced customer who must have access to the source code for the middleware package and is prepared to accept the version that they recompile is now different than the standard middleware package.

The risk is that the customer modifications to the package or the process of recompiling the code on the user's machine may produce unexpected changes in the middleware package's behavior. The middleware vendor typically will limit the liability that they will accept for programs modified by the customer, especially if the source code also has been modified. The code to support the new protocol must be integrated fully into the existing source code of the middleware package, and may require modifications to the software architecture of the middleware package. Accomplishing this requires highly specialized knowledge of the implementation of the middleware package, which is usually highly complex and may be large in number of lines of code. It requires highly skilled programmers and a large amount of programming time. Along with the risk previously discussed, there is the additional high cost of obtaining a source code license. Most middleware package licenses are expensive because of the investment in the complex middleware package code that the vendors wish to protect. Therefore, undertaking the additional support for new protocols is not a viable option for most users of middleware software.

Thus there is a need for the capability of adding different transport protocols to a middleware based application, which can be added by the application programmer without rewriting the middleware program itself. The mechanism by which this can be accomplished is a new API, known as a Pluggable Protocol Interface. This API specifies a set of functions to be implemented by a plugged in protocol provider allowing the middleware to use a common set of protocol functions (e.g. establish a connection, send data, receive data . . . ). Additionally this API specifies a set of functions which will allow the protocol provider to announce protocol events to the middleware (e.g. signal_data_available, new_connection, ... ).

A significant problem arises when the middleware, via the pluggable protocol interface, must support an arbitrary protocol. In particular, the problem of how signaling takes place between the arbitrary protocol and the middleware package. The protocol may not use endpoint identifiers that the middleware can use directly to block or wait upon for data or events. For example, for the internally supported common protocols (e.g. TCP/IP), the middleware can directly utilize the underlying O/S mechanisms (file descriptors, select, read and write).

SUMMARY OF THE INVENTION

Stated generally, the present invention provides a connection bridge mechanism that allows arbitrary protocols to be added or plugged into a middleware based application without accessing the source code for the middleware or producing a new version of the middleware source code. By making use of a connection bridge, the plugged in protocol can be utilized by the middleware without requiring that the same O/S primitives which are utilized internally by the middleware be supported by the plugged in protocol. For example, for internally supported protocols, the middleware may use the O/S primitive "select", to wait on multiple TCP/IP endpoints; the present invention allows the plugged in protocol implementer to utilize a possibly different set of O/S primitives to implement similar functionality. The plugged in protocol can be utilized in addition to the internally supported middleware protocols or it can replace the existing middleware protocols.

The connection bridge provides the communication between the protocols and the middleware package. The communication bridge queues the requests from the protocols and notifies the middleware when there are requests pending for action by the middleware. The connection bridge allows the middleware to wait upon data to be available at the endpoints of multiple arbitrary protocols simultaneously.

Other features and advantages of the present invention will become apparent from the specification when taken in conjunction with the drawings and the attached claims.

BRIEF DESCRIPTION OF THE DRAWINGS

FIGS. 2A and 2B illustrate an embedded computer system that can include the present invention.

DETAILED DESCRIPTION OF THE DISCLOSED EMBODIMENT

Figure 1:
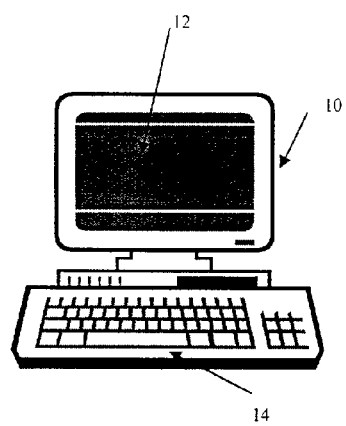
FIGS. 1A and 1B illustrate a traditional general-purpose computer system that can include the present invention.
Figure 1:
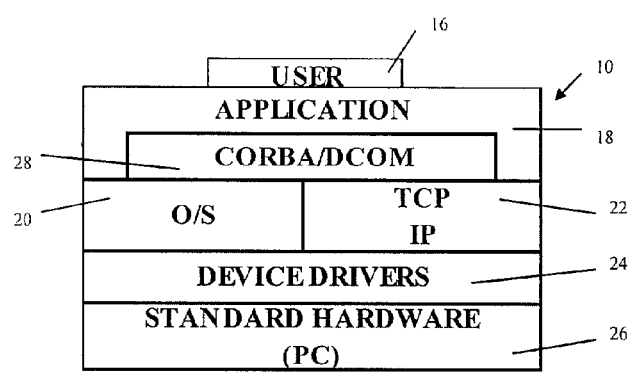

Referring now to the drawings, in which like numerals indicate like components and elements throughout the several drawing figures, FIGS. 1A and 1B illustrate a traditional general-purpose computer. The general-purpose computer is designated generally by the reference numeral 10. The hardware is typically standard personal computer (PC) hardware and typically includes a monitor 12 and a keyboard 14, with which a user (not illustrated) operates the standard computer 10 in a conventional manner.

The functional configuration of a distributed middleware based application of the computer 10 is illustrated in FIG. 1B, where a user is indicated as a block 16. The user 16 communicates as previously mentioned through the keyboard 14 with an application 18. As illustrated, the computer 10 can be considered a stack of software and hardware with the application 18 communicating directly with an operating system 20. The operating system 20, such as Windows or UNIX, includes the input/output (I/O) protocols 22, which can be any of a variety of protocols and are listed for example purposes as a Transmission Control Protocol (TCP) which enables two hosts to establish connection and exchange streams of data.

The protocol TCP guarantees delivery of data and also guarantees that packets will be delivered in the same order in which they are sent, allowing the computer 10 to be networked with other computers as will be described hereinafter. The operating system 20 also includes device drivers 24, which then operates with the standard PC hardware 26. A distributed application refers to a computer system that uses more than one computer 10 to run an application.

Many such distributed applications utilize object-oriented programming, wherein programmers define not only the data type of a data structure, but also the types of operations that can be applied to the data structure. In this manner, the data structure becomes an object that includes both data and functions. A programmer can simply create a new object that inherits many of the features from existing objects. This makes object-oriented programs easier to modify.

The distributed application 18 is often implemented on a subsystem called "middleware" 28. Several types of middleware are commonly utilized to hide the operating system 20 and the protocol specifics 22 to build distributed computer system applications. One example of middleware is a Common Object Request Broker Architecture (CORBA), which is an architecture that enables the pieces of computer programs in the form of objects to communicate with one another, regardless of what programming language they are written in or what operating system they are running on. There are a number of implementations of CORBA. Another competing middleware technology is Microsoft's Distributed Component Object Model (DCOM).

Referring to FIGS. 2A and 2B, an embedded computer system 30 is illustrated. The embedded computer system 30 is part of a larger system or machine, such as a telephone system, x-ray equipment, oil-well sensors, etc. The embedded computer typically does not utilize a user interface I/O, and therefore does not include a screen and keyboard. The embedded computer system may contain custom hardware 32 and custom software 36 written specifically for the larger system application. Here the device drivers 34 are part of the application software 36. The middleware 35, again for example CORBA, has the same functions in general as the traditional computer 10, however it must allow more control and application-specific functions for the embedded application. The operating system preferably is a real-time operating system (RTOS) 38, and may include the communication protocols TCP/IP 40 as well as other application specific protocols.

Figure 3:
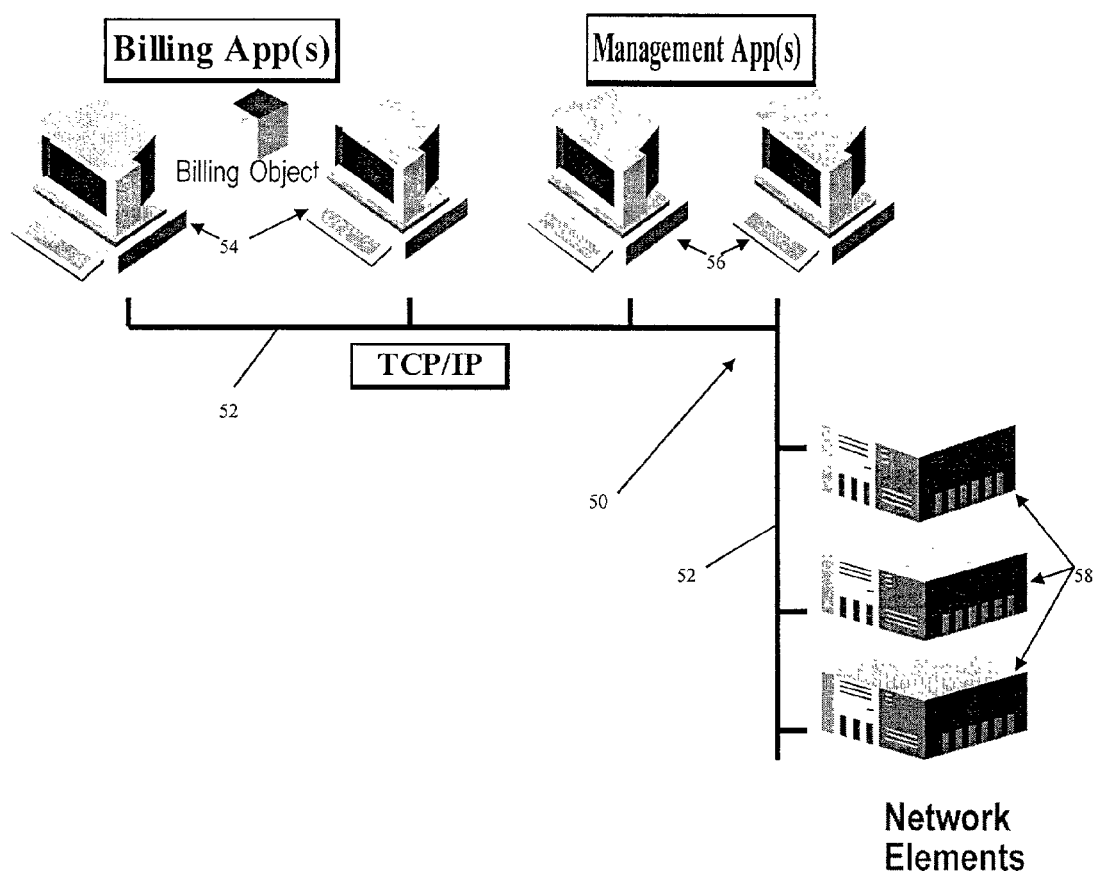
FIG. 3 is an illustration of a distributed computer system.

FIG. 3 illustrates one example of distributed computer system software forming a telecommunications system 50. The system 50 includes a network bus 52, which interconnects a plurality of computers, only a few of which are shown for example purposes, that form the computer system 50 for the telephone network. The bus 52 is shown as a hard-wired bus, but could also be a combination of a local bus and computers connected over the Internet or other type of network. The network bus 52 can be coupled to a plurality of traditional computers, for example a number of billing computers 54, and a number of management application computers 56, for overall management of the system functions. The computers 54 and 56 typically would be in one or more telephone operators' management centers, and typically include standard protocols.

The system 50 also includes a plurality of network elements 58, which communicate over the network 52 to the traditional computers 54 and 56, and serve to control the telephone and data network functions, such as switching for telephone calls and data traffic. The network elements 58 typically are implemented with several or many computers inside each element in an embedded computer configuration utilizing one or another type of middleware, such as CORBA. It is desirable for the network elements 58 to communicate errors, warnings, and system events to the management applications 56 and to one another, if desired. It would be desirable to provide the system 50 with the capability of adding additional protocols.

Figure 4:
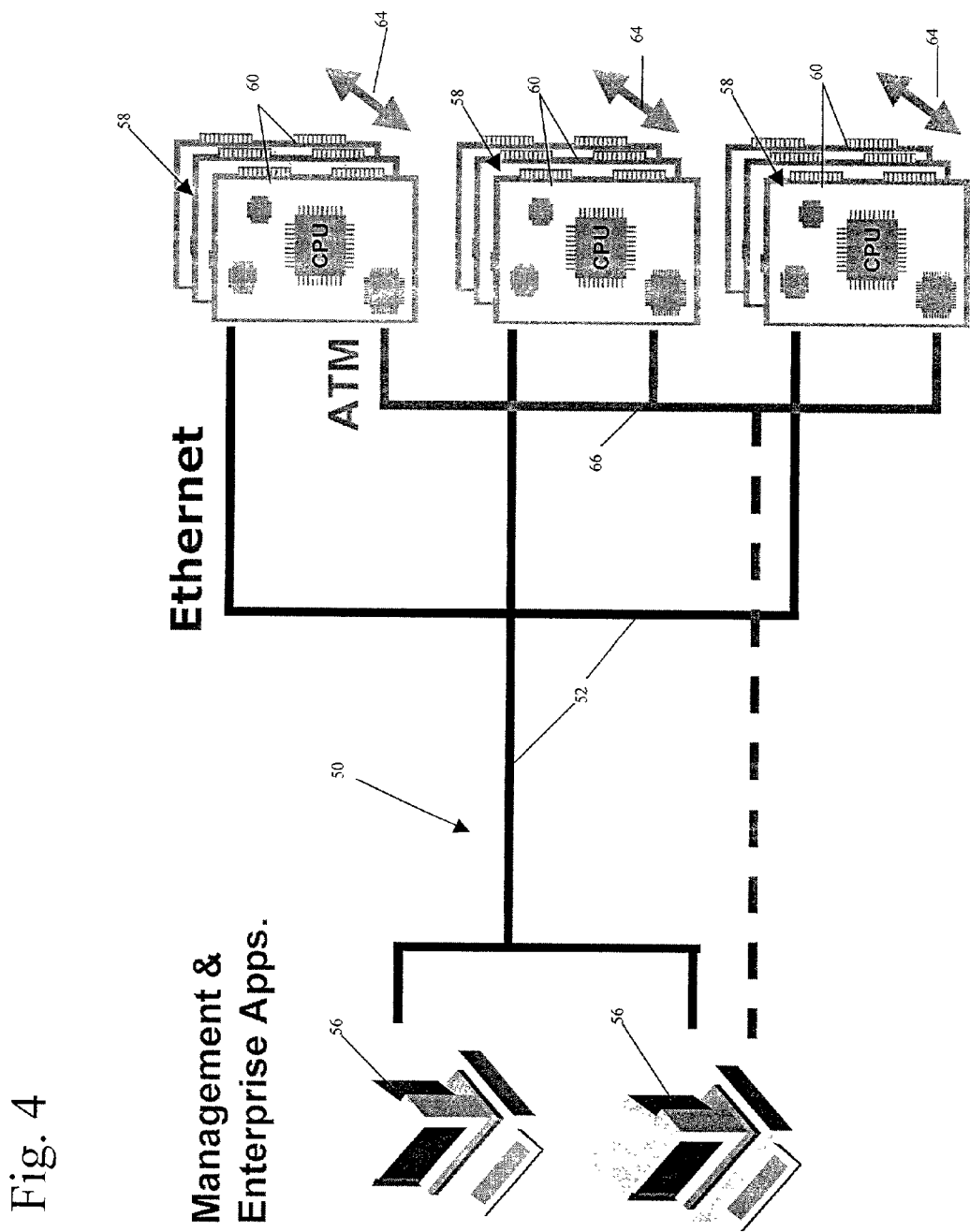
FIG. 4 is a further diagrammatic illustration of the distributed computer system of FIG. 3.

FIG. 4 illustrates an expansion of the telecommunications system 50 of FIG. 3. Again, the management application computer 56 communicates with the network elements 58 on the network 52, which can be an Ethernet network over which the TCP/IP protocol can be utilized. Each of the network elements 58 can be considered a node or a rack containing a plurality of cards 60, with each card including an embedded computer 62. The cards in one of the network element racks communicate with one another via a protocol operating over a backplane or bus 64 that connects them in the rack. Typically, the backplane 64 includes its own protocol, such as Peripheral Component Interconnect (PCI), which is a local bus standard developed by Intel Corporation. Most present personal computers include a PCI bus. There are other types of backplane protocols, such as VersaModule Eurocard (VME), which is a 32-bit backplane bus that is widely utilized in industrial, commercial and military applications and is manufactured by many companies worldwide.

The communication between cards in different network element racks 58 takes place over another network 66, which interconnects the cards 60 between racks within the network element 58. The communication between the different racks 58 again utilizes a different protocol such as Asynchronous Transfer Mode (ATM).

Figure 5:
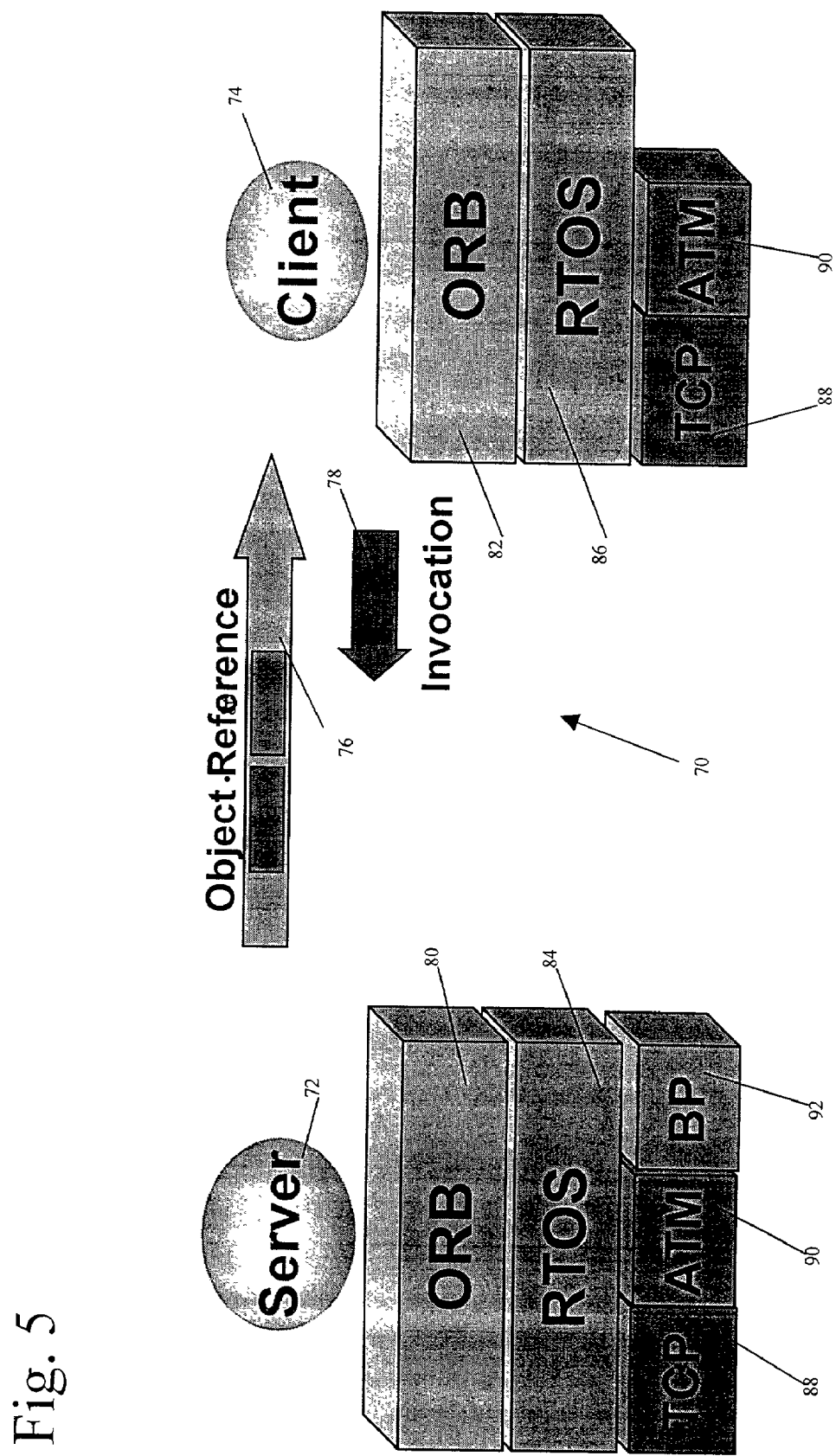
FIG. 5 is a diagrammatic illustration of protocol selection and configuration between a server and a client application.

FIG. 5 is a diagram 70 that illustrates the protocol selection and configuration between a server 72 and a client 74. The server 72 will send an object reference 76 to the client 74 in response to an invocation 78 from the client 74. Both the server 72 and the client 74 include an Object Request Broker (ORB) 80 and 82 respectively. The ORB is an implementation of a middleware package that in addition to providing a common distribution mechanism also allows the application programs to perform management tasks such as selecting and configuring protocols. Each of the server 72 and client 74 also includes an Operating System, here illustrated as a real-time operating system (RTOS) 84 and 86, respectively. The server 72 publishes one or more protocols in the Object Reference 76. The Object Reference 76 is an entity within the CORBA programming model that allows the client to establish contact with the server. In this case, the server is illustrated as having published TCP protocol 88, an ATM protocol 90. The client 74 selects which protocol to connect to the object via the protocol configuration and here has the TCP protocol 88 and the ATM protocol 90.

Figure 6:
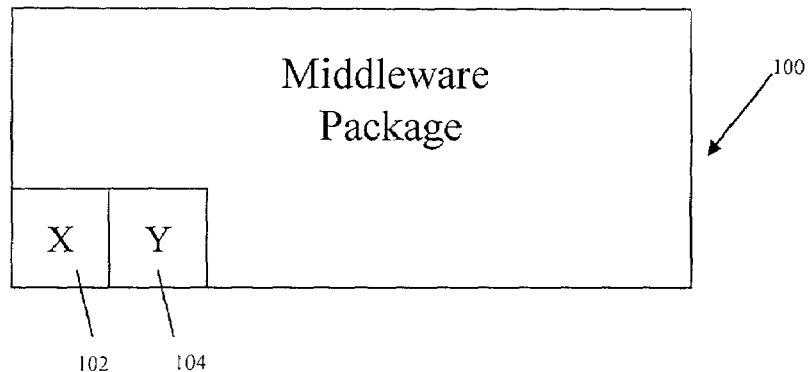
FIG. 6 is a diagrammatic illustration of a middleware package with supporting protocols.

FIG. 6 illustrates a middleware package 100 which supports two protocols: an X protocol 102 and a Y protocol 104. The middleware package could be CORBA or other type of middleware package. The protocols 102 and 104 could, for example be TCP and ATM. For all systems which include the protocols 102 and 104 and do not desire or require other protocols, the middleware package 100 supports all the necessary communications. However, for a client or other system that is interconnected with the middleware package 100 that requires a different protocol, the middleware configuration 100 is not sufficient.

Figure 7:
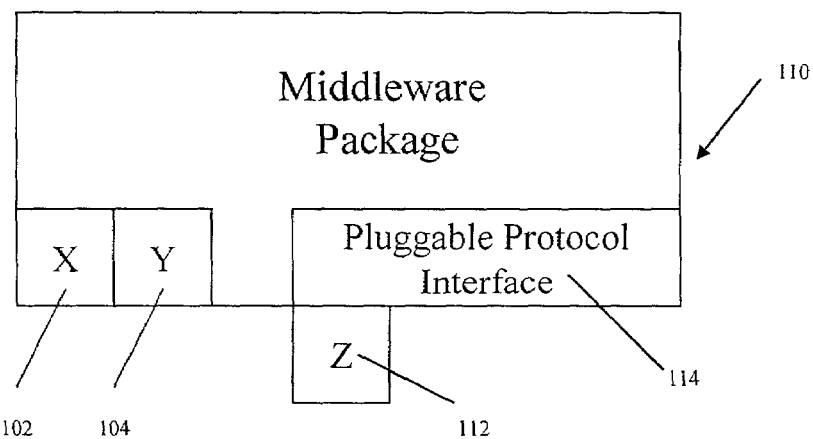
FIG. 7 is a diagrammatic illustration of a middleware package with supporting protocols and an optional plugged-in protocol of the present invention.

FIG. 7 illustrates a first embodiment of a middleware package 110, which supports an additional Z protocol 112 through a pluggable protocol interface 114. In this embodiment of the present invention, the support for the Z protocol 112 is provided by code plugged in through the pluggable protocol interface 114, as will be described hereinafter. The X protocol 102 and the Y protocol 104 are still supported by the middleware package source code as an integral part of the middleware 110 in the same manner as the middleware package 100.

Figure 8:
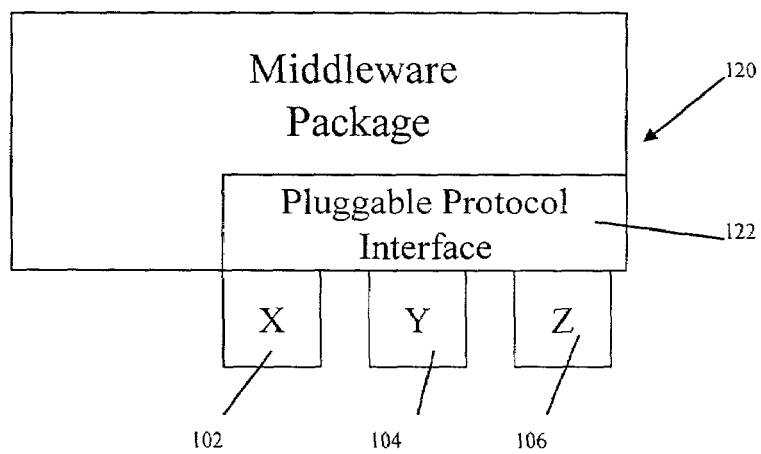
FIG. 8 is a diagrammatic illustration of a middleware package including all protocols supported by the plugged-in protocol interface.

FIG. 8 illustrates another protocol embodiment of a middleware package 120, wherein the middleware does not support any protocols in its software package. In this embodiment 120, each of the X protocol 102, Y protocol 104 and Z protocol 106 are supported by code in a pluggable protocol interface 122. The interface 122 effectively decouples the code that implements the support of the particular protocols 102, 104 and 106 from the code that implements the middleware package 120 itself. The resulting API for the pluggable protocol interface 122 may be somewhat complex. However, compared to the problems associated with manipulating the source code for the middleware package 120 itself, utilizing the interface 122, will be much more flexible and less complex. The details of the interface 122 are critical since the interface formalizes the relationship between the middleware package 120 and the plugged in protocols 102, 104 and 106.

The range of protocols that can be plugged into the middleware package 120 and the efficiency of the resulting pairing of the middleware and a protocol will depend upon how the interface 122 allows the protocol to be interfaced to the middleware. The efficiency is measured principally in terms of the run-time performance of the middleware 120 when utilizing the plugged in protocols 102, 104 and 106 contrasted to the integral protocols in the middleware package 100. If the coupling between the middleware 120 and a protocol 102, 104 or 106 is inefficient, the performance and scalability of the overall middleware and protocol operation will be impacted. An efficient mechanism that allows the implementation of a pluggable protocol, conforming to the pluggable protocol interface 122, is a connection bridge. This connection bridge will allow the middleware 120 to wait for data and events from multiple instances of, and potentially multiple different types of, plugged in protocols 102, 104, 106.

Figure 9:
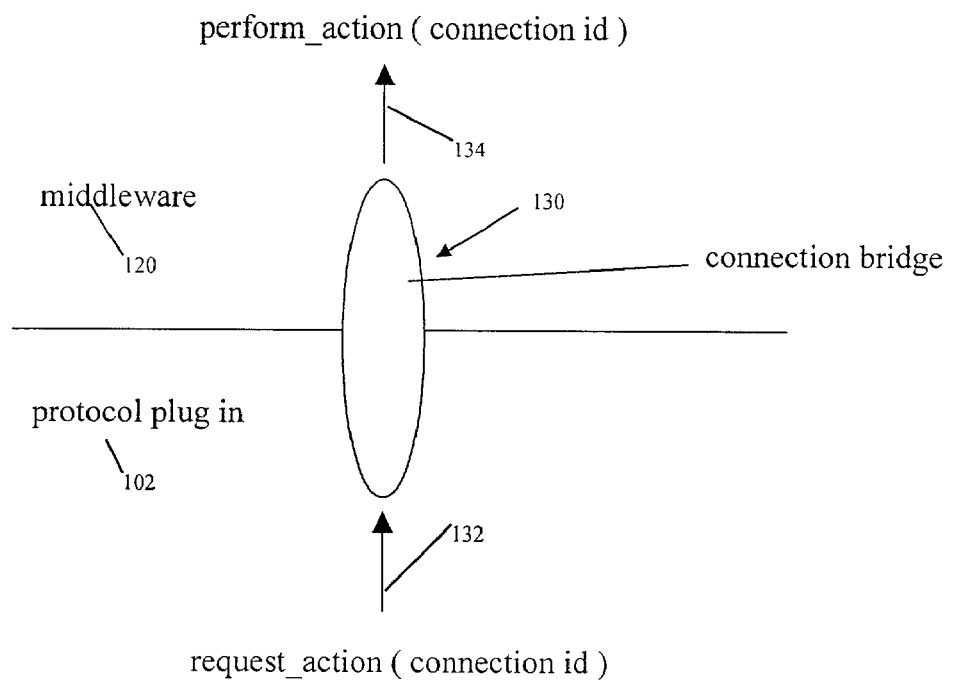
FIG. 9 is a diagrammatic illustration of a connection bridge utilized with a pluggable protocol interface.

FIG. 9 illustrates an abstract description of a connection bridge 130 of the present invention. The connection bridge 130 queues connection IDs from request action operations performed by one of the plugged-in protocols 102, 104 or 106, and notifies the middleware 120 that there are requests pending. The middleware 120 then is activated to read each connection ID from the connection bridge 130 and perform the action requested. A request action connection ID 132 is coupled to the connection bridge 130 from the plugged-in protocol. From the connection bridge 130, the middleware 120 reads the connection ID and performs the action upon it as indicated by perform action 134.

The connection bridge 130 is a mechanism within the pluggable protocol interface 122, which supports the interface 122 to provide scalability, high performance, and support for a wide variety of protocols. The connection bridge 130 notifies the middleware 120 that there is a connection ready to have an action performed on it, and transfers the connection identifier (ID) to the middleware 120. The connection identifier is just a numeric identifier for a connection end-point managed by the plugged-in protocol 102. It does not have to be the actual identifier utilized by the O/S primitive used within the protocol (e.g. a file descriptor), but can be the same value as long as it is a numerical value and is unique within the scope of the protocol instance.

The middleware 120 receives the action request from the connection bridge 130 and performs the action upon the connection that is indicated by the connection identifier. This typically involves the middleware 120 making one or more call-backs to the plugged-in protocol 102 and passing the connection identifier back to the protocol to let the protocol know which connection is involved in each operation. The purpose of the connection identifier is to allow the plugged-in protocol 102 and the middleware 120 to exchange communications and operations about a given connection in the plugged-in protocol 102 without the middleware 120 knowing the particular type of connection. The operation names request_action 132, and perform_action 134 are abstract or symbolic. The names of the operations in a connection bridge implementation will be specific to the particular action taking place, such as request_connection_accept, perform_connection_request, request_process_invocation, perform_process_invocation, or the names may just be accept_connection and process_request on both sides of the connection bridge 130.

Figure 10:
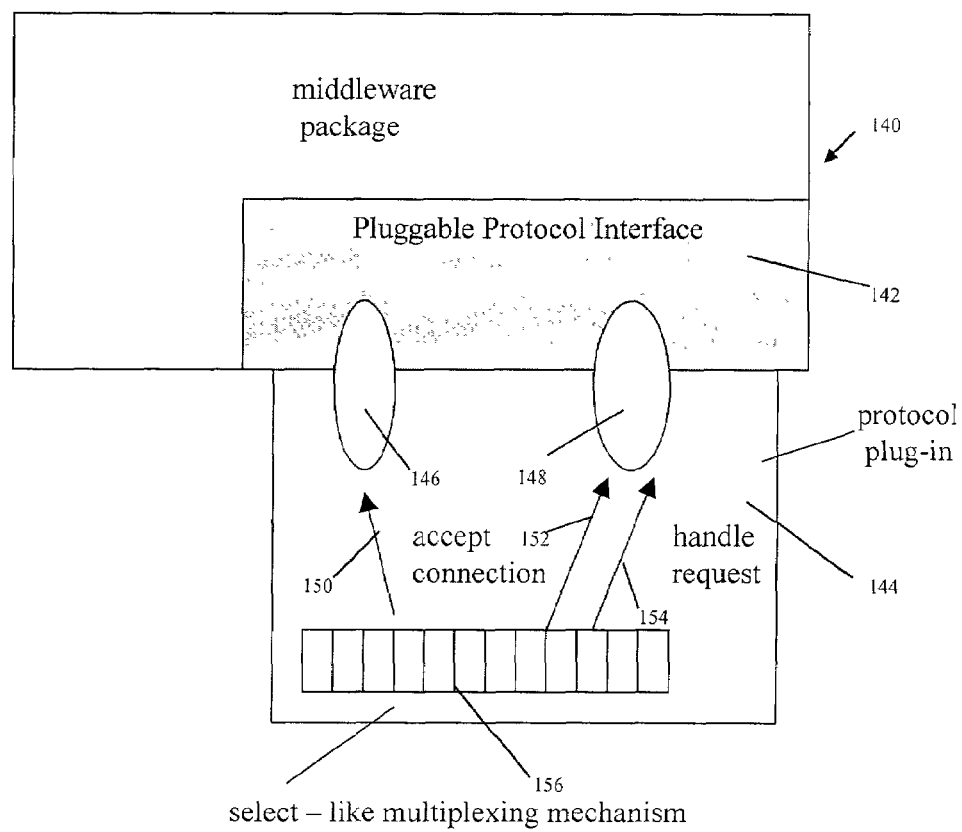
FIG. 10 is a diagrammatic illustration of the operation of the connection bridge of the present invention.

Referring now to FIG. 10, a middleware package 140 includes a pluggable protocol interface 142 with a protocol plug-in 144. In the interface 142, a plurality of instances of a connection bridge 146 and 148 are utilized. In this embodiment, the connection bridge 146 connects to accept new connections 150 while the connection bridge 148 receives data or handles requests 152 and 154 on an existing connection. The accept connection 150 and handle request operations 152 and 154 can be directed to the connection bridge as 146 and 148 by a select mechanism 156, which operates like a multiplexing device.

If desirable, a plurality of connection bridges may be utilized in the API. Each of the connection bridges, such as 146 and 148, can be associated with a different aspect of the cycle of handling requests via the plugged-in protocol 144. One can be involved with new connections with clients communicating with that protocol, one can handle requests on existing connections, etc. By utilizing multiple connection bridges, the identity of the bridge being utilized can determine the semantics of the operation to be performed. For example, the connection bridge 146 will only be forwarding "accept connection" requests 150. In a single connection bridge operation, all the information has to be passed with the connection ID to indicate what action is to be taken by the middleware package.

Even if only one connection bridge is utilized per instance of a plugged-in protocol, the middleware must be able to handle actions from multiple connection bridges simultaneously because there can be multiple protocols plugged in and multiple instances of the same protocol may be needed, for example, to support multiple end-points on the same or different network interfaces or network cards.

Figure 11:
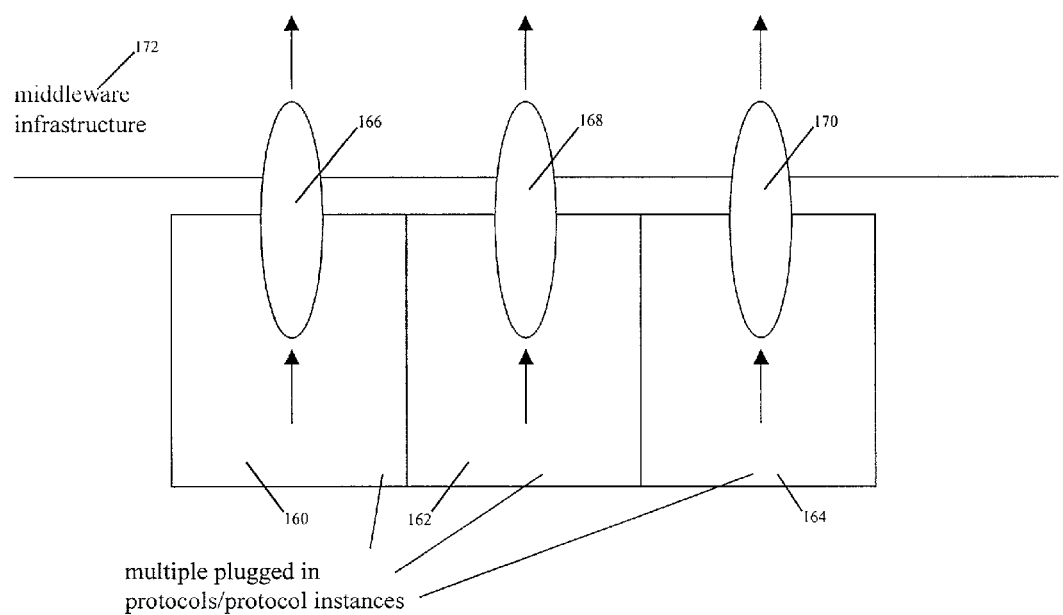
FIG. 11 is a diagrammatic illustration of the operation of multiple connection bridges.

FIG. 11 illustrates three plugged-in protocols, 160, 162 and 164. In FIG. 11, each of the protocols 160, 162 and 164 includes a connection bridge 166, 168 and 170. The middleware infrastructure 172 (not illustrated) has to be capable of handling action requests made simultaneously via the multiple connection bridges 166, 168 and 170 since there are multiple protocols plugged into the middleware infrastructure. Also, although the protocols 160, 162 and 164 can be different protocols, they also can be multiple instances of the same protocol needed to support multiple end-points on the same or different network interfaces. The connection bridges 166, 168 and 170 may be presented to the user of the pluggable protocol interface as a single object within an object oriented language such as such as C++ whose functions take a connection identifier as a parameter. The name of the functions within the connection bridge object can indicate the function of that connection bridge operation such as accept_connection or dispatch_request. The abstract steps involving performing these operations will be described with respect to the flow charts illustrated in FIGS. 16 and 17.

Figure 12:
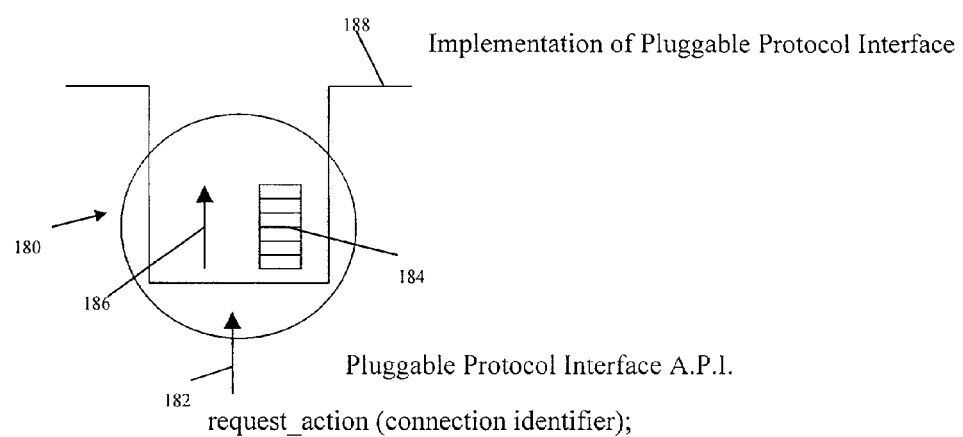
FIG. 12 is a diagrammatic illustration of the separation provided by the connection bridge interface.

Referring now to FIG. 12, the separation between the connection bridge implementation 180, which is part of the pluggable protocol interface's implementation and the connection bridge's appearance as part of the pluggable protocol's interface API, is illustrated. The connection bridge 180 receives the request action 182 from the applicable protocol O/S primitive. The requests are queued in the queue 184, and then a notification 186 is sent to the implementation of the pluggable protocol interface 188, which separates the requests from the notifications. This enables the connection bridge 180 to have a variety of implementations depending upon the architecture of the middleware package that the pluggable protocol interface is integrated with. This separation of the connection bridge interface and semantics from its implementation results in the plugged-in protocol not being aware of which implementation is being utilized and hence it is decoupled from the middleware package's internal implementation. A given middleware implementation also may support multiple connection bridge implementations, supporting multiple alternate dispatch models within the middleware package.

As depicted in FIG. 12, a connection bridge implementation requires both a notification mechanism and a queuing mechanism. An example of the connection bridge implementation is an operating system synchronization primitive (such as a condition variable or a semaphore) for signaling (notifying) and a FIFO queue data structure for queuing connection identifiers. A suitable operating system (OS) primitive may be available that combines the two requirements. For example, an operating system-provided message queue primitive, which allows messages (connection identifiers in the connection bridge implementation) to be queued and will wake up (notify) one of a number of "waiters" when a connection identifier is available to be read from the queue by the middleware. Another example is an operating system "select" mechanism that can wait to receive a set of I/O endpoints (which must be of a type that can be represented as selectable operating system file descriptors) that will then wake up when data is ready to be available to be read on one or more of the endpoints.

In the select operation, a file descriptor included in the set that the select call waits-upon is used to provide the notification capability of the connection bridge, and also at the same time, to pass the connection ID information. The notification is achieved because the select system call will wake up the waiter whenever data is available to be read on that file descriptor. The passing of the connection ID information is achieved by writing the connection ID to the I/O endpoint that the middleware will read from. The middleware then reads the connection ID from that endpoint when the select call is completed and indicates that there is data to be read on that file descriptor.

The other portion of the select-based implementation of the connection bridge is the configuration of the I/O endpoint that allows the connection bridge implementation to write the connection ID to that endpoint. The implementations can use two connected I/O endpoints. For example: two UDP sockets, both connected to the same port on the loop-back network interface or two UNIX domain sockets bound to the same address.

The connection bridge implementation also may use a single instance of some other operating system provided primitive, that is represented by a file descriptor which can be used in the operating system select call. For example:
 a UNIX pipe or
 a VxWorks pipe (a primitive specific to the VxWorks RTOS) or
 any other operating system provided primitive that is manipulated via selectable file descriptors.

In the notification requirement of the connection bridge implementation, a key requirement is that multiple waiters (O/S thread) may wait for connection identifiers to be queued on the same connection bridge. When one or more of the connection identifiers is queued, then exactly one of the waiters (it does not matter which one, as long as it is just one) should be allowed to take each connection identifier off the queue. Once a waiting thread has read a connection identifier from the connection bridge, the thread performs the action associated with that connection bridge on the connection specified by the connection identifier that was read by the thread. Once the thread has finished performing the appropriate action, it again waits to read an identifier from the connection bridge.

For a request handling (or dispatching) connection bridge, the waiter thread handles or dispatches the request that is indicated as being ready to be read from the connection. This action will involve calling back into the corresponding protocol interface code that is plugged into the pluggable protocol interface.

Figure 13:
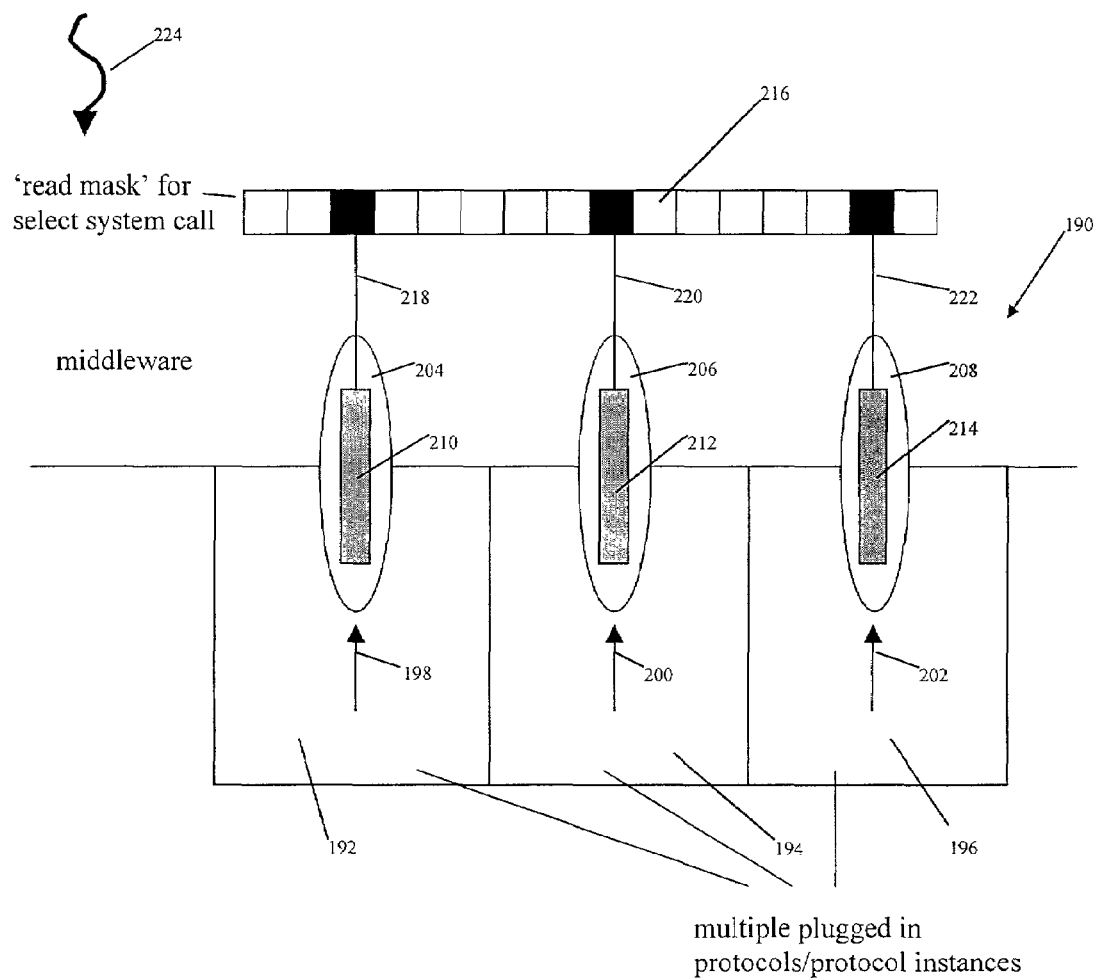
FIG. 13 is a diagrammatic illustration of a select-based implementation using multiple connection bridges.

Referring now to FIG. 13, a select-based implementation 190 for handling action requests for multiple connection bridges is illustrated. The select-based implementation 190 allows multiple connection bridge instances to be handled simultaneously. A plurality of different protocols or separate instances of the same protocol 192, 194 and 196 are plugged in. Each of the protocols 192, 194 and 196 is depicted as issuing a request action connection identifier 198, 200 and 202 at the same time. Each of the protocols or protocol instances 192, 194 and 196 includes a separate connection bridge respectively, 204, 206 and 208. Each of the action requests 198, 200 and 202 is queued into an entity forming part of the connection bridge which is capable of queuing the connection IDs and also is presented as a file descriptor capable of being utilized in a select call. This can be an O/S pipe or a UDP loop-back connection or a similar entity 210, 212 and 214. The pipe or loop-back connection 210, 212 and 214 combines both connection bridge roles of queuing the connection IDs and notifying the middleware when an action request is available.

The system select call includes a read mask 216. The read mask 216 includes all the file descriptors for the connection bridges 204, 206 and 208, as well as any internally used file descriptors for any internally supported protocols. The file descriptors on the middleware side are one for the read-end in each of the connection bridges 204, 206 and 208 as indicated by lines 218, 220, and 222. A middleware thread 224 then is utilized with the read mask 216 in a select call to select a read_mask, write_mask, exception_mask or a time out. As illustrated, the read mask 216 is utilized with the select call to indicate that there is data to be read on one or more of the file descriptors corresponding to one of the connection bridges 204, 206 and 208. The file descriptors can be read repeatedly (in any desired order) until there is no more data to be read from the connection bridges 204, 206 and 208. Each piece of data is the connection identifier associated with one action request from one of the plugged-in protocols 192, 194 and 196.

Figure 14:
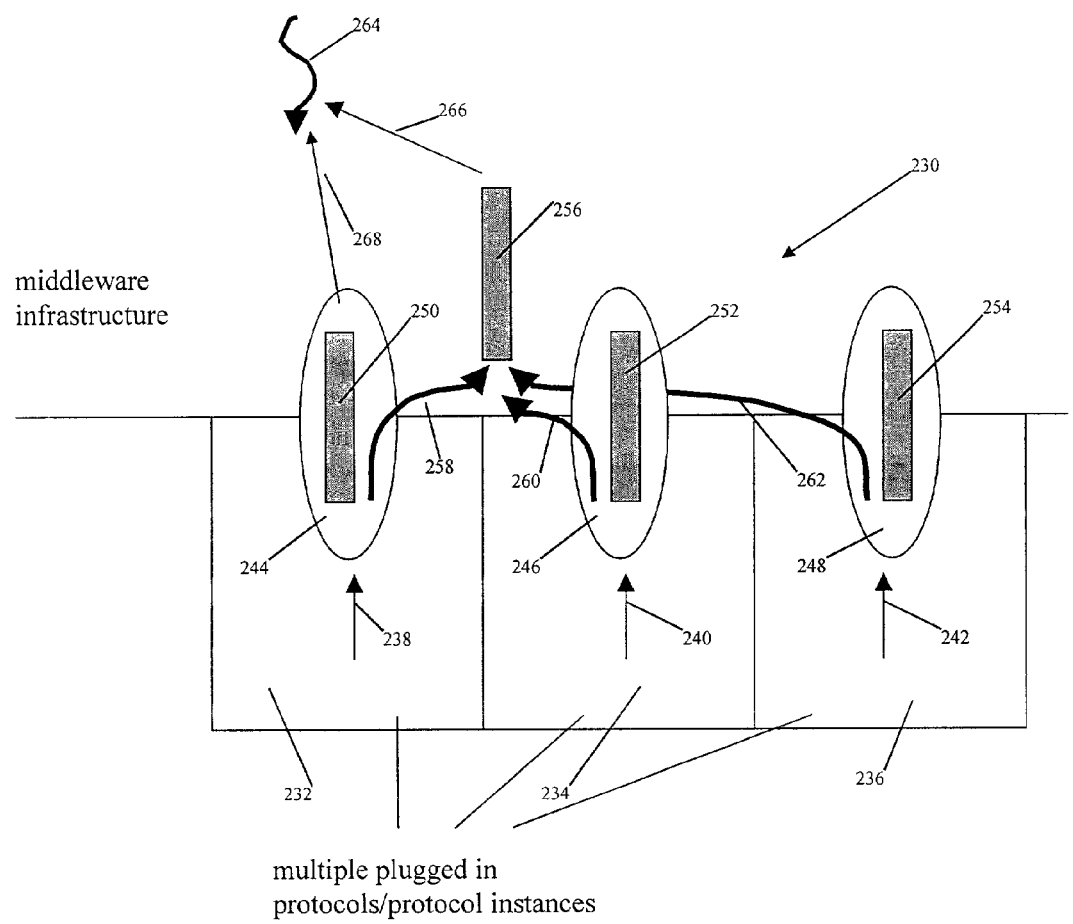
FIG. 14 is a diagrammatic illustration of a message queue-based implementation for multiple connection bridges.

FIG. 14 illustrates a message queue-based implementation 230 for handling action requests from multiple connection bridges like the select-based implementation 190. Again, a plurality of protocols are plugged in or different instances of the same protocol 232, 234 and 236, which send respective action request connection identifiers 238, 240 and 242 to respective connection bridges 244, 246 and 248. Each connection bridge 244, 246 and 248 includes a respective message queue 250, 252 and 254. Unlike the select implementation 190, the queue and the notify operations are separate in the message queue-based implementation 230. Each of the connection bridges 244, 246 and 248 shares use of a single message queue 256, which is utilized to indicate that there are requests available in one or more of the connection bridges. A separate connection bridge identifier, preferably a numerical value, is assigned to each connection bridge that is used in the queue 256 when an action request is present in the connection bridges as shown by respective arrows 258, 260 and 262.

When an action is requested, in addition to the connection identifier that the action is to be performed on being written to the respective connection bridge queue 250, 252 and 254, the connection bridge identifier for that bridge is written to the common queue 256. A thread 264 from the middleware infrastructure is utilized to perform an action and first reads a connection bridge identifier from the common message queue 256, as indicated by an arrow 266. Once a connection bridge identifier is read by the thread 264 from the common queue 256, the thread 264 reads the connection identifier from the connection bridge corresponding to the connection bridge identifier, as illustrated by an arrow 268. The thread 264 then performs the action on that connection identifier.

Figure 15:
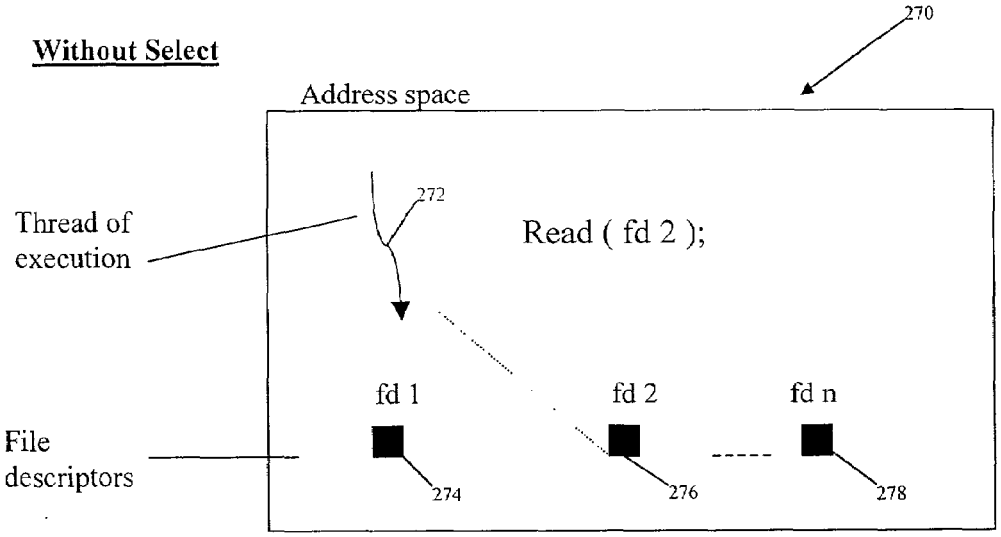
FIGS. 15A and 15B illustrate the operations of the connection bridge with and without a select function.
Figure 15:
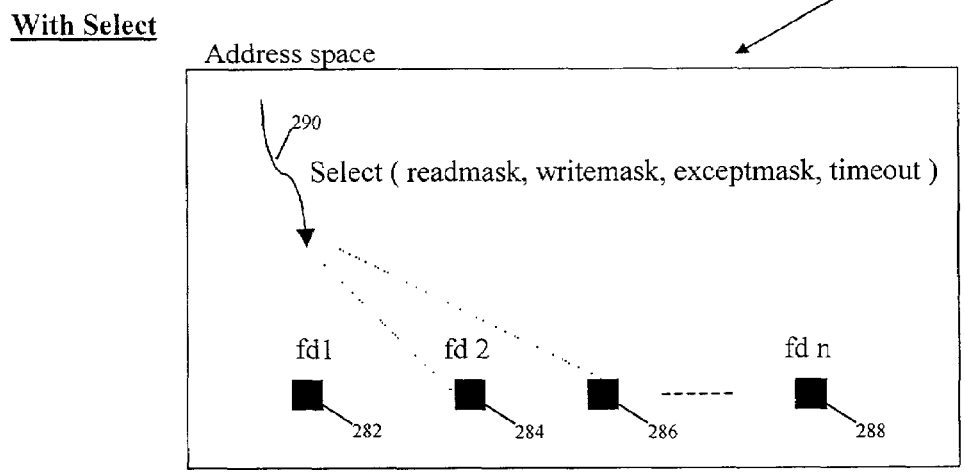

FIGS. 15A and 15B contrast reading without select in FIG. 15A and reading with select in FIG. 15B. An address space 270 is illustrated. Without the select function, the middleware infrastructure must use a read system call to wait for data to be ready to be read on a file descriptor. As illustrated, a thread of execution 272 is being utilized to read one file descriptor from a plurality of file descriptors 274, 276 and 278. The read calls have the following characteristics:

must read on a single file descriptor (illustrated as the second file descriptor 276) at a time;
the read call may be blocking or not blocking (polling) and
the read call usually does not have a time out capability on a blocking read, so that the thread 272 will read the file descriptor 276 until there is no further data to be read or an exception or an error occurs.

Referring now to FIG. 15B, a select address space 280 is illustrated with a plurality of file descriptors 282, 284, 286, and 288 illustrated. Unlike with the read described in FIG. 15A, the select call 290 employs several bit masks as was discussed in FIG. 13. For example, select can include a read mask, a write mask, an exception mask and a time out. Therefore using select, the thread 290 and the bit mask allow the select function to be utilized on one or any plurality of the file descriptors such as 284 and 286, as illustrated. With the select function, the operation may simultaneously wait to see if any of the indicated file descriptors has data ready to be read on it, is ready to have data written to it, or has had an exception (error) occur. The read may be blocking or non-blocking and can have a time out specified on the blocking call, such that the select thread will return after a prescribed amount of time if none of the indicated file descriptors is ready for a particular operation.

The term "file descriptor" was originally designated in the UNIX system as a handle to a regular file in a UNIX file system. The file descriptor included "read to" and "write from" the associated file. This was extended within UNIX to represent an endpoint on a network connection, and endpoint on a UNIX pipe (a way of sending data between a sender and a reader, potentially in different UNIX processes). The concept is now utilized to represent I/O endpoints in general on many different operating systems.

Figure 16:
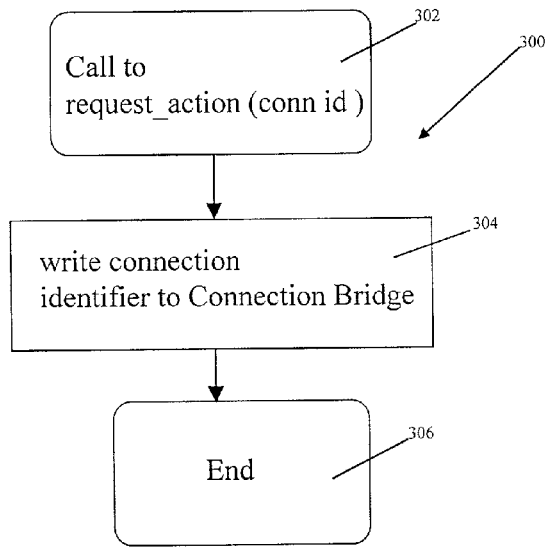
FIG. 16 is a flow diagram of the request action of the connection bridge.

A flow chart 300 of a request action operation of the present invention is illustrated in FIG. 16. A call to request action 302 is followed by a step of writing the connection identifier to the connection bridge 304, following which the request action terminates or ends as shown by a block 306.

Figure 17:
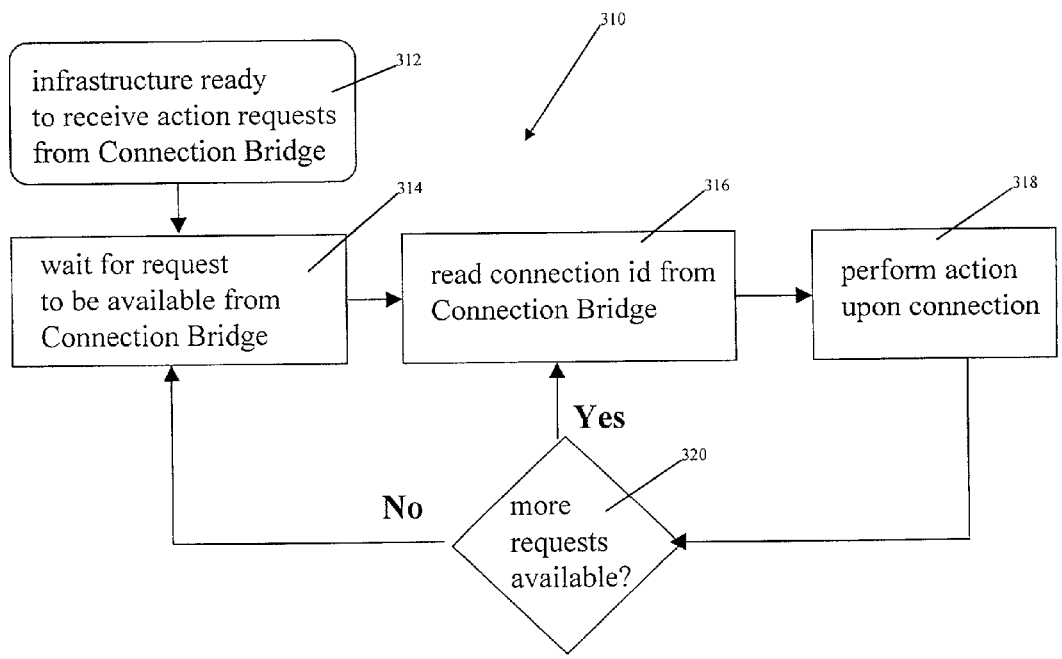
FIG. 17 is a flow diagram of the perform action of the connection bridge.

A perform action operation is illustrated by a flow chart 310 in FIG. 17. The middleware infrastructure is ready to receive action requests from the connection bridge as illustrated by a step 312. This could be when the protocol instance is fully initialized. The middleware infrastructure then waits for a request to be available from the connection bridge, as illustrated by a step or block 314. As utilized herein, the terms "step" and "block" are utilized interchangeably. When a request is available, the middleware will then read the connection ID from the connection bridge as illustrated by a block 316. The middleware then will perform the action requested upon the connection ID, as shown by a step 318. Once the middleware has performed the action upon the connection ID in block 318, it will then check to see if more requests are available as illustrated by a block or step 320. If more requests are available, then it will repeat steps 316, 318 and 320. If there are no more requests available initially or if all the requests have been read, then the action will return to the wait for request step 314. When another request becomes available, the cycle will repeat itself as described.

Figure 18:
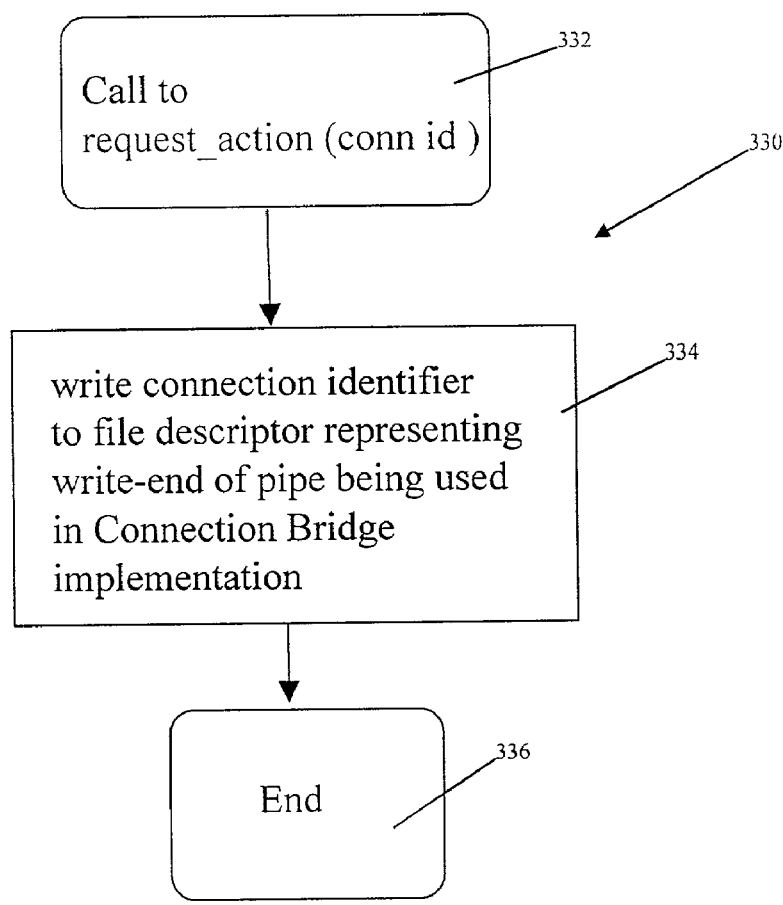
FIG. 18 is a flow diagram of the select-based implementation of the request action of the connection bridge.

A request action operation 330 in a select implementation is illustrated in FIG. 18. The request action 330 includes a call to request action in a step 332. The call 332 results in writing the connection identifier to a file descriptor representing the write-end of a pipe being utilized in the connection bridge implementation as illustrated by a step 334. Once the file descriptor has been written into the write end of the pipe, the request action will end as indicated by a step 336.

A representative code (with annotations) of the operation of FIG. 18 follows:

| request action (for select implementation) |
| --- |
| (Takes connection identifier wish to have action performed on as parameter)<br>    request_action(in connection_id)<br>(Get file descriptor of write-end of this connection bridge's pipe)<br>    PipeFD := get_write_side(Pipe);<br>(Write the connection identifier to the pipe)<br>    write_data(PipeFD, connection_id); |

Figure 19:
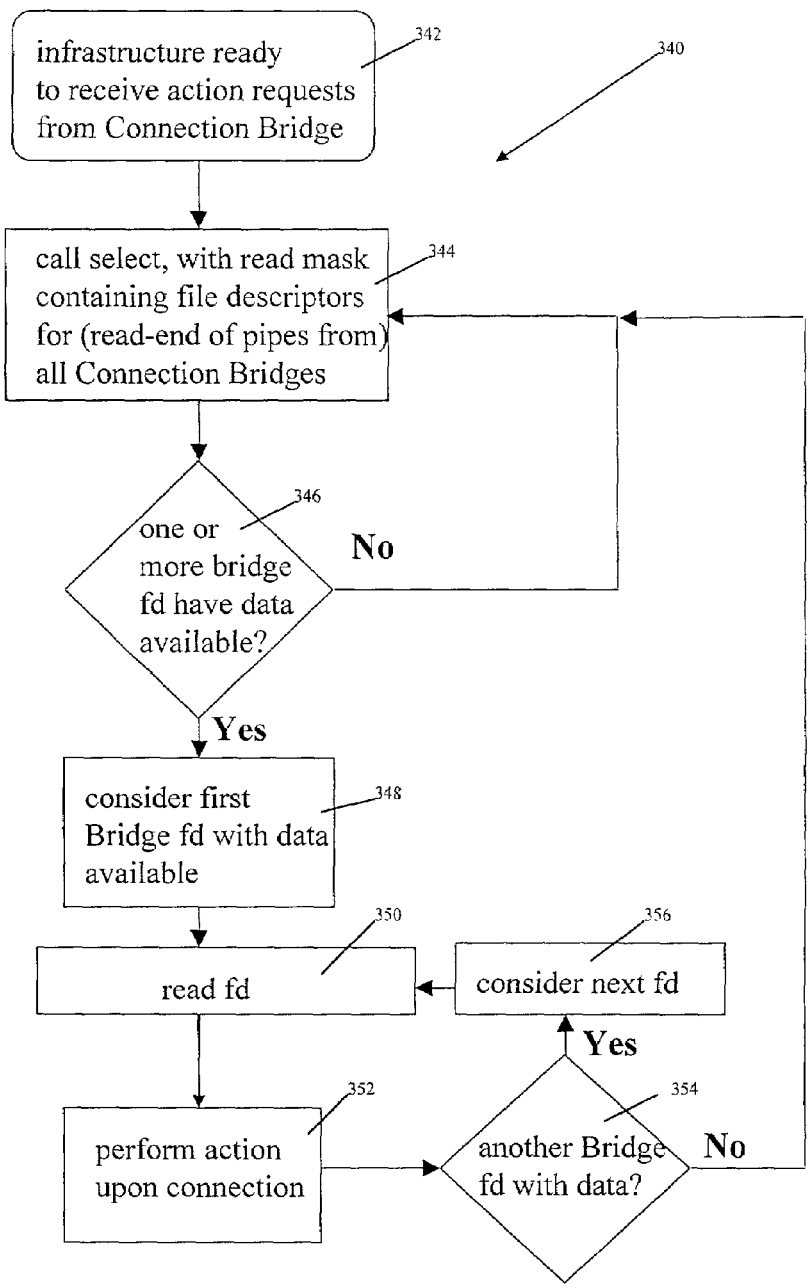
FIG. 19 is flow a diagram of the select based implementation of the perform action of the connection bridge.

A perform action in a select implementation 340 is illustrated in FIG. 19. The middleware infrastructure indicates it is ready to receive action requests from the connection bridge as indicated by a step 342. The next step is a call to select with a read mask containing the file descriptors for the read-end of pipes from one or a plurality of the connection bridges, as illustrated by a step 344. Next a determination is made if one or more connection bridge field descriptors have data available, as illustrated by a step 346. If there is no data available, the step 344 will be returned to. If one or more connection bridge file descriptors has data available, then the first connection bridge file descriptor with data available will be chosen as indicated by step 348.

Once the call to select considers a particular connection bridge with data available, it then reads the file descriptor as shown by step 350. It then will perform the required action upon the file descriptor that it has read in step 350 as indicated in a step 352. The thread will then see if another connection bridge has a file descriptor with data, as indicated by a step 354. If no other file descriptor is found with data, then it will return to the step 344. If another file descriptor with data is found that next file descriptor will be considered in step 356, and again a connection identifier will be read from the file descriptor and the action will be performed upon that connection identifier as shown in steps 350 and 352 before returning to step 354 and repeating the cycle.

Once each file descriptor that had data available to be read has been considered, the thread returns to step 344.

A representation code (with annotations) of the operation of FIG. 19 follows:

---
perform action (for select implementation)

(Note that FD_SET and FD_ISSET are standard functions provided by an Operating System that implements the select system call. They set a file descriptor in a select mask and test if a file descriptor in a select mask is set, respectively.)
    perform_action()
    (Prepare a select read mask indicating interest in data being available on the read file descriptor for the pipe associated with any of the active Connection Bridges.)
        (Start with the read mask reset. (No file descriptors selected.)
            ReadMask := 0;
(Also need to know the highest file descriptor value in the mask. Start off with the variable set to −1 (an out of range value))
HighestFD := −1;
        (Iterate over the set of all active Connection Bridges)
            Loop Bridge over BridgeList
        (For each Connection Bridge, get the file descriptor corresponding to the read-end of the pipe it uses.)
            PipeFD := get_read_side(Bridge.Pipe);
        (Set the bit in the read mask corresponding to that file descriptor)
            FD_SET(PipeFD, ReadMask);
        (Also make a note of the file descriptor number, if it is the highest one considered so far.)
            If PipeFD > HighestFD
            HighestFD := PipeFD
            endIf;
            endLoop;
    (Now Loop forever.)
        Repeat
    (Call Operating System 'select', passing in the read mask. Get back a mask indicating which file descriptors are ready to read.)
            ActiveMask := SELECT(ReadMask);
    (Check to see if some of the specified file descriptors are ready to have a read performed on them (in case select call returned for any other reason, such as an exception.))
            If ActiveMask != 0 then
    (If so, consider each file descriptor in the mask in turn.)
                CurrentFd := 0;
            Do
    (Check if the currently considered file descriptor is ready to read.)
                If FD_ISSET(CurrentFD, ActiveMask) then
    (If so, read a connection identifier from that descriptor.)
                    ConnectionId = read_data(CurrentFD);
    (And perform the requested action upon that connection.)
                    execute_request(ConnectionId);
                endIf;
    (Increment the current file descriptor.)
                CurrentFD := CurrentFD + 1;
    (Then loop, until all file descriptors up to the highest have been considered.)
                While CurrentFD <= HighestFD
            endIf;
    (After all file descriptors have been checked, go back to calling select.)
            endRepeat;
        end;
---

Figure 20:
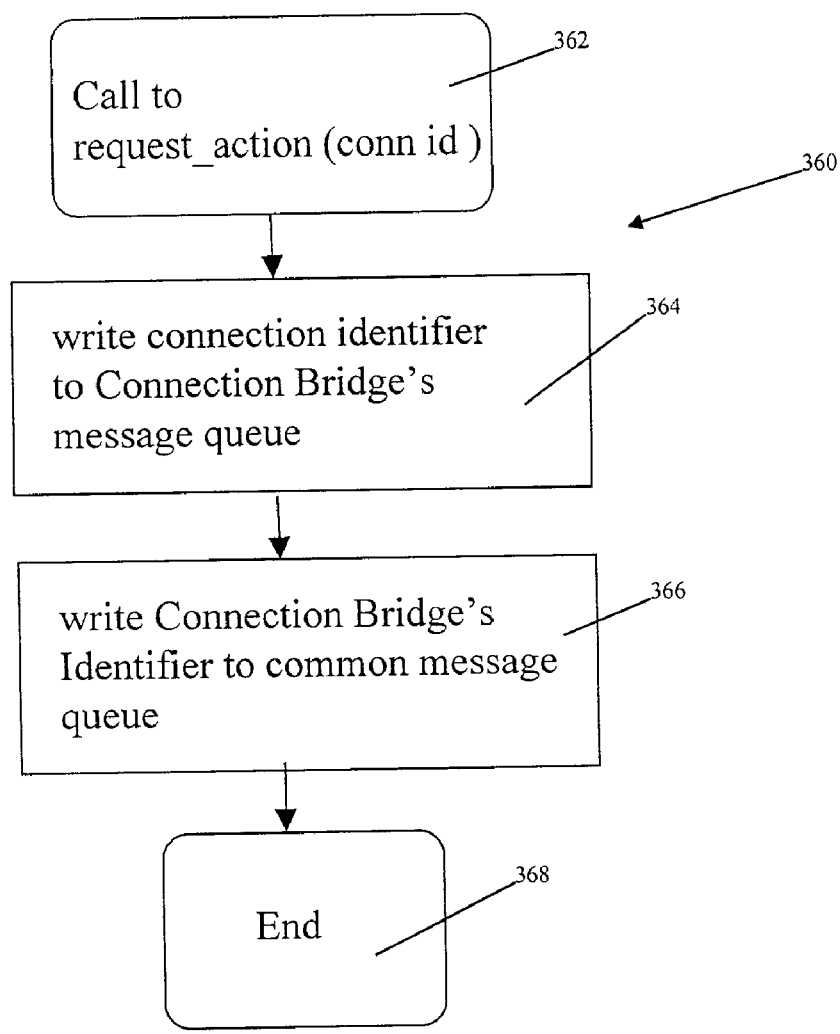
FIG. 20 is flow diagram of a message queue implementation of the request action.

A flow chart 360 of a message queue based implementation of request action is illustrated in FIG. 20. A call to request action is first performed in a step 362, which is followed by a step 364 of writing a connection identifier to the connection bridge's message queue. An additional step 366 then is required to write the connection bridge's identifier to the common message queue as shown by a step 366, and then the action ends as shown by a step 368.

A representation code (with annotations) of the operation of FIG. 20 follows:

---
request action (for message queue implementation (Take connection identifier wish to have action performed on as parameter.)
        request_action(in connection_id)
    (Write the connection identifier to this Connection Bridge's connection identifier message queue.)
        send_message(id_queue, connection_id);
    (Get handle to the common, Connection Bridge identifier message queue.)
        common_queue := get_common_queue();
    (Then write this Connection Bridge's identifier to the common message queue.)
        Send_message(common_queue, bridge_id);
    End;
---

Figure 21:
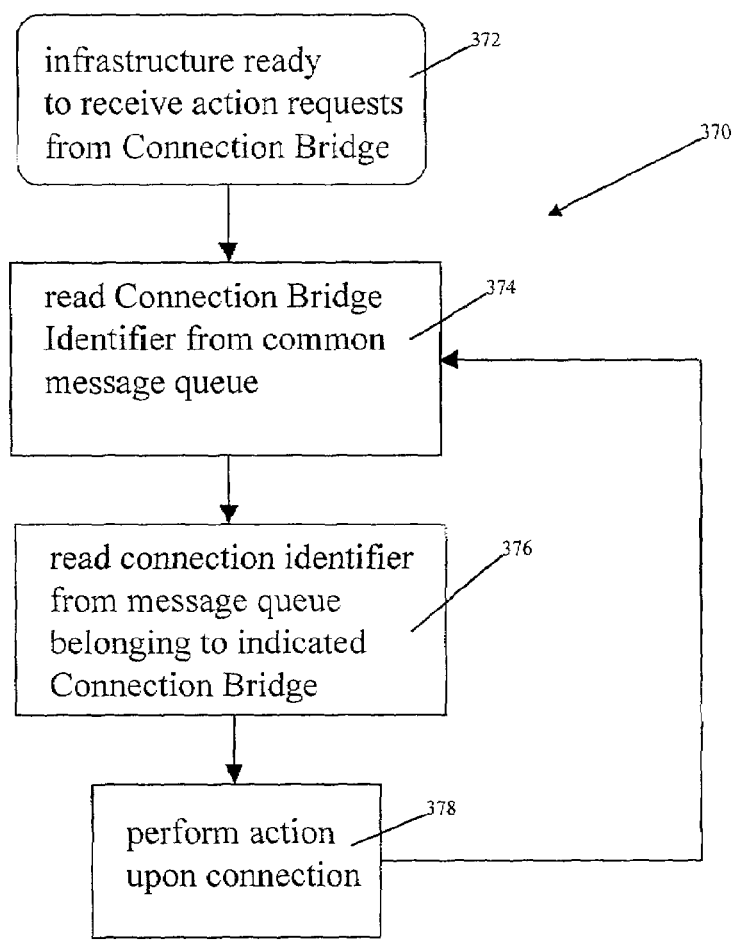
FIG. 21 is a flow diagram of the message queue implementation of a perform action of the connection bridge.

A perform action flow chart 370 in a message queue implementation is illustrated in FIG. 21. Again, the middleware infrastructure indicates it is ready to receive action requests from the connection bridges as illustrated by a step 372. The infrastructure will then read the connection bridge identifier from the common message queue as shown in a step 374. A next step 376 is to read the connection identifier from the message queue which belongs to the indicated connection bridge. The action is then performed upon the connection ID as shown by a step 378 and then the operation returns to the step 374 to read the next connection bridge identifier that has data residing in the common message queue.

A representation code (with annotations) of the operation of FIG. 21 follows:

---
perform request (for message queue implementation)

perform_action()
    (Create an array that maps a Connection Bridge identifier to the queue associated with that Connection Bridge.)
        (Interate over all active Connection Bridges.)
            Loop Bridge over BridgeList
        (For each Connection Bridge, get its identifier.)
            index := get_id(Bridge);
        (Store a pointer to the message queue associated with that Connection Bridge as the n'th element in the array, where n = its Bridge identifier.)
            bridge_queue[index] := get_queue(Bridge);
            endLoop;
    (Loop forever.)
        Repeat
    (Get the next Connection Bridge identifier off of the common message queue (This call will block until an identifier is available))
            bridge_id := get_message_blocking(common_queue);
    (Look up the message queue corresponding to the Connection Bridge identifier that was read.)
            ActiveQueue := bridge[bridge_id];
    (Read the next connection identifier off of that message queue.)
            get_message(ActiveQueue, connection_id);
    (Then perform the requested action upon the indicated connection.)
            execute_request(connection_id);
        endRepeat;
        end;
---

Although the present invention has been disclosed and described in terms of a preferred embodiment, it is not intended that the invention be limited to such embodiments. A specific middleware connection bridge implementation has been described utilizing object-oriented programming, but as previously stated, the invention is not so limited. Modifications within the spirit of the invention will be apparent to those skilled in the art. The scope of the present invention is to be limited only by the claims, which follow.

What is claimed is:

1. A method for allowing arbitrary protocols to be added or plugged into a distributed application utilizing middleware for communication without accessing the source code for the middleware or producing a new version of the middleware source code, comprising the steps of:

providing a first computer executing middleware, one or more transport protocols and first application software, the first application software being part of the distributed application;

providing a second computer executing second application software, the second application software being part of the distributed application;

providing a connection bridge for communicating between the one or more transport protocols and the middleware of the first computer;

as a result of communication between the first application software and the second application software, generating an action requests by at least one transport protocol of the one or more transport protocols, the action request including a protocol connection identifier;

sending the action request to the connection bridge;

said connection bridge notifying said middleware that an action request is ready to have an action performed;

said connection bridge transferring said protocol connection identifier to said middleware; and adding to the middleware of the first computer an additional transport protocol in support of communication between the first and second application software using the protocol connection identifier and without accessing the source code for the middleware or producing the new version of the middleware source code.

2. The method of claim 1, wherein said at least one transport protocol is such that the middleware is not configured to directly communicate with said at least one transport protocol.

3. The method of claim 1, wherein said connection bridge further communicates with multiple protocol instances and different types of protocols.

4. The method of claim 1, wherein said connection bridge further communicates with existing internally supported transport protocols of the middleware.

5. The method claim 1, further including performing said steps in an object-oriented programming language.

6. The method of claim 1, including implementing said connection bridge by utilizing a synchronization primitive and FIFO queue.

7. The method of claim 1, wherein the communication between the first application software and the second application software comprises executable code.

8. The method of claim 7, wherein the communication between the first application software and the second application software further comprises an invocation of an object residing at the second computer by the first application software and the sending of the object to the first application software by the second application software.

9. The method of claim 8, wherein the first application software is a client software and the second application software is a server software.

10. The method of claim 1, wherein the second computer is an embedded computer.

\* \* \* \* \*